United States Patent
Laas et al.

(10) Patent No.: US 6,767,958 B2
(45) Date of Patent: Jul. 27, 2004

(54) MODIFIED POLYISOCYANATES

(75) Inventors: Hans-Josef Laas, Bergisch Gladbach (DE); Reinhard Halpaap, Odenthal (DE)

(73) Assignee: Bayer Aktiengesellschaft, Leverkusen (DE)

( * ) Notice: Subject to any disclaimer, the term of this patent is extended or adjusted under 35 U.S.C. 154(b) by 69 days.

(21) Appl. No.: 10/276,344

(22) PCT Filed: May 7, 2001

(86) PCT No.: PCT/EP01/05143
§ 371 (c)(1),
(2), (4) Date: Nov. 14, 2002

(87) PCT Pub. No.: WO01/88006
PCT Pub. Date: Nov. 22, 2001

(65) Prior Publication Data
US 2004/0034162 A1 Feb. 19, 2004

(30) Foreign Application Priority Data
May 18, 2000 (DE) .......................... 100 24 624

(51) Int. Cl.$^7$ .............................. C08G 18/30

(52) U.S. Cl. .......................... 524/840; 528/71; 560/25; 252/182.22; 428/423.1

(58) Field of Search ................... 252/182.22; 560/25; 528/71; 524/840; 428/423.1

(56) References Cited

U.S. PATENT DOCUMENTS

| | | | |
|---|---|---|---|
| 2,660,574 A | * 11/1953 | Wilford et al. | 528/371 |
| 4,056,564 A | 11/1977 | Wolf et al. | 260/512 C |
| 4,433,095 A | 2/1984 | Hombach et al. | 524/563 |
| 4,663,377 A | 5/1987 | Hombach et al. | 524/196 |
| 5,098,983 A | 3/1992 | Mosbach et al. | 528/59 |
| 5,194,487 A | 3/1993 | Jacobs | 524/591 |
| 5,334,637 A | 8/1994 | Zwiener et al. | 524/539 |
| 5,389,718 A | 2/1995 | Potter et al. | 524/591 |
| 5,473,011 A | 12/1995 | Laas et al. | 524/840 |
| 5,594,148 A | 1/1997 | Wroblowsky et al. | 548/263.6 |
| 6,426,414 B1 | 7/2002 | Laas et al. | 544/222 |

FOREIGN PATENT DOCUMENTS

| | | |
|---|---|---|
| CA | 1 061 043 | 8/1979 |
| DE | 14 95 745 | 6/1969 |
| EP | 0 324 370 | 7/1989 |
| EP | 0 703 255 | 3/1996 |
| GB | 1 447 612 | 8/1976 |

* cited by examiner

Primary Examiner—Rachel Gorr
(74) Attorney, Agent, or Firm—Joseph C. Gil; Thomas W. Roy

(57) ABSTRACT

The present invention relates to a modified polyisocyanate which is the reaction product of a polyisocyanate with 2-(cyclohexylamino)-ethanesulfonic acid and/or 3-(cyclohexylamino)-propanesulfonic acid, to a process for preparing these modified polyisocyanates, to coating compositions containing these modified polyisocyanates and to coated substrates prepared from these coating compositions.

15 Claims, No Drawings

MODIFIED POLYISOCYANATES

BACKGROUND OF THE INVENTION

The invention relates to modified polyisocyanates and polyisocyanate mixtures, a process for their preparation and their use as starting components in the preparation of polyurethane plastics, in particular as crosslinking agents for water-soluble or —dispersible paint binders or binder components with groups which are reactive towards isocyanate groups.

Against the background of increasingly stricter environmental legislation, water-dispersible polyisocyanates have gained importance for various fields of use in recent years. They are currently used in particular as crosslinking components for high-quality water-dilutable two-component polyurethane paints (2C PU paints) or as an additive for aqueous dispersion adhesives, are used for crosslinking aqueous dispersion in textile finishing or formaldehyde-free textile printing inks and moreover are also suitable, for example, as auxiliary substances for wet-strength finishing of paper (cf. e.g. EP-A 0 959 087 and literature cited herein).

In practice, practically exclusively nonionic polyisocyanates modified hydrophilically with the aid of polyethers are currently employed for all these fields of use. The preparation of such water-dispersible polyisocyanates is discussed in detail, for example, in EP-A 0 959 087, page 2, lines 25–46.

In spite of their wide market acceptance for the most diverse uses, however, polyether-modified polyisocyanates have a number of main disadvantages. Because of a very high viscosity maximum which is to be overcome during dispersing, for example, they can often be incorporated homogeneously into aqueous media only by applying considerable shear forces (e.g. high-speed stirrers). The high polyether content required for adequate dispersibility, in particular for use as crosslinking agents in aqueous 2C PU paints, furthermore imparts a permanent hydrophilicity to the coatings obtained.

To bypass these disadvantages, attempts have also already been made to prepare self-dispersible polyisocyanates modified hydrophilically by incorporation of ionic groups.

EP-A 0 443 138, EP-A 0 510 438 and EP-A 0 548 669 describe, for example, polyisocyanate mixtures which contain chemically bonded carboxyl groups. Such polyisocyanates can indeed be stirred into aqueous systems in very fine division after neutralization of the carboxyl groups without high shear forces being necessary, but they have a completely inadequate storage stability, especially in the neutralized form. Because of the known catalytic activity of the carboxylate group, a polymerization of the isocyanate groups already starts at room temperature, for example with trimerization to polyisocyanurates or formation of α-nylon structures, which as a rule leads to gelling of the product after a few days.

EP-A 0 703 255 describes ionically hydrophilized water-emulsifiable polyisocyanates which comprise, as emulsifiers, reaction products of polyisocyanate and any desired hydroxy-, mercapto- or amino-functional compounds with at least one sulfuric acid group or anion thereof. Sulfuric acid builder components which are mentioned here as preferred for the preparation of the emulsifiers are hydroxysulfonic acids with aliphatically bonded OH groups or salts of such hydroxy-sulfonic acids, for example specific polyether-sulfonates, such as are marketed e.g. under the name Tegomer® (Th. Goldschmidt A G, Essen, D E), bisulfite adducts on unsaturated alcohols, such as are obtainable e.g. in accordance with the doctrine of DE-A 2 417 664, DE-A 2 437 218 or DE-A 2 446 440, hydroxyethane- and hydroxypropanesulfonic acid and aminosulfobetaines, which can be prepared by quaternization of tertiary amino alcohols with 1,3-propanesultone. However, these hydrophilizing agents also have a number of disadvantages.

Thus, for example, hydroxypropanesulfonic acid is in equilibrium with its anhydride, 1,3-propanesultone, which is classified as carcinogenic. It can therefore be handled on an industrial scale, in particular, exclusively in the form of aqueous solutions and is consequently unsuitable in principle as a builder component for the preparation of modified polyisocyanates.

On the other hand, hydroxyethanesulfonic acid, polyether-sulfonates of the Tegomer® type and the bisulfite adducts on unsaturated alcohols mentioned are also available as anhydrous products in the form of their sodium salts on a large industrial scale. The use of these sodium salts indeed in principle allows the preparation of water-emulsifiable polyisocyanates, but these have only a very limited suitability for use as crosslinking components in aqueous paint systems. Because of the only low compatibility of alkali-neutralized sulfonate groups with conventional paint binders, their use in aqueous 2C PU paints in general leads to cloudy, in some cases inhomogeneous coatings. In contrast to the volatile neutralization amines conventionally employed in dispersions, the sodium ion remains in the paint film even after curing and imparts a permanent hydrophilicity to this.

All the hydroxysulfonic acids proposed as hydrophilic components in EP-A 0 703 255 moreover lead, as the concrete embodiment examples of this publication demonstrate, as a rule to significantly yellow-coloured polyisocyanates, which also obstructs a use of these products as crosslinking components in high-quality paint systems. For the reasons mentioned, polyisocyanates modified with sulfonate groups have not yet been able to establish themselves on the market.

The object of the present invention was therefore to provide new water-dispersible polyisocyanates which are suitable for all the fields of use of water-dispersible polyisocyanates and do not have the disadvantages of the prior art. These new polyisocyanates should be based on readily accessible, toxicologically acceptable builder components which allow a free choice of the neutralizing agent, and in particular should be readily compatible with conventional paint binders.

It has been possible to achieve this object by providing the water-dispersible polyisocyanates or polyisocyanate mixtures according to the invention which are described below in more detail. To simplify the description of the present invention, in the following the term "polyisocyanates" synonymously also means mixtures of various polyisocyanates.

SUMMARY OF THE INVENTION

The present invention is based on the surprising observation that, in spite of their melting points of above 300° C., 2-(cyclohexylamino)-ethanesulfonic acid and 3-(cyclohexylamino)-propanesulfonic acid, which in general are used as zwitter-ionic biological buffer substances, can already be reacted with polyisocyanates under very mild reaction conditions in the presence of a suitable neutralization amine, storage-stable, light-coloured products which can be emulsified in water in finely divided form being obtained. This was surprising, since a number of other aminosulfonic acids which are very similar in structure cannot be reacted with polyisocyanates even under considerably more drastic conditions.

Although the use of compounds containing sulfonate groups for the preparation of hydrophilic polyisocyanates is co-mentioned globally in some publications, for example EP-A 0 061 628 and EP-A 0 206 059, the subject matter of which is polyether-modified polyisocyanates, and hydroxysulfonic acids and aminosulfonic acids are also mentioned as suitable builder components for water-dispersible crosslinking agents in EP-A 0 469 389, it has not been possible for the expert to obtain any indication from these publications, as in the same way from the doctrine of EP-A 0 703 255, of the particular suitability of 2-(cyclohexylamino)-ethanesulfonic acid and 3-(cyclohexylamino)-propanesulfonic acid for the preparation of water-dispersible polyisocyanates.

The present invention therefore provides modified polyisocyanates which are obtainable by reaction of polyisocyanates with 2-(cyclohexylamino)-ethanesulfonic acid and/or 3-(cyclohexylamino)-propanesulfonic acid. These are dispersible in water after neutralization of at least a proportion of the sulfonic acid groups. The invention also provides the use of these sulfonic acids for the preparation of water-dispersible polyisocyanates.

DETAILED DESCRIPTION OF THE INVENTION

The dispersibility of polyisocyanates already modified with, for example, ethylene oxide polyether units is considerably improved by the modification according to the invention with 2-(cyclohexylamino)-ethanesulfonic acid and/or 3-(cyclohexylamino)-propanesulfonic acid, so that the use of external emulsifiers or the use of high shear forces can be dispensed with, which considerably simplifies the preparation of the ready-to-use formulations. This is a further aspect of the present invention.

In particular, polyisocyanates with a) an average isocyanate functionality of at least 1.8,
b) a content of isocyanate groups (calculated as NCO; molecular weight=42) of 4.0 to 26.0 wt. %,
c) a content of sulfonate groups (calculated as $SO_3^-$; molecular weight=80) of 0.1 to 7.7 wt. % and optionally
d) a content of ethylene oxide units bonded within polyether chains (calculated as $C_2H_4O$; molecular weight=44) of 0 to 19.5 wt. %, wherein the polyether chains contain a statistical average of 5 to 55 ethylene oxide units, which are obtainable by reaction of aliphatic, cycloaliphatic, araliphatic and/or aromatic polyisocyanates with 2-(cyclohexylamino)-ethanesulfonic acid and/or 3-(cyclohexylamino)-propanesulfonic acid are provided according to the invention.

The invention also provides a process for the preparation of these modified polyisocyanates. For this, a polyisocyanate is reacted with 2-(cyclohexylamino)-ethanesulfonic acid and/or 3-(cyclohexylamino)-propanesulfonic acid, it being possible for this reaction to be carried out in the presence of polyalkylene oxide polyether alcohols containing ethylene oxide units and/or the polyisocyanates employed optionally already containing such units. For neutralization of sulfonic acid groups, the reaction is carried out in the presence of tertiary amines.

In particular, the reaction is carried out by a procedure in which

A) a polyisocyanate component with an average functionality of 2.0 to 5.0 and a content of aliphatically, cycloaliphatically, araliphatically and/or aromatically bonded isocyanate groups (calculated as NCO; molecular weight=42) of 8.0 to 27.0 wt. %
B) 0.3 to 25.0 wt. %, based on the total weight of components A) and B), of 2-(cyclohexylamino)-ethanesulfonic acid and/or 3-(cyclohexylamino)-propanesulfonic acid and optionally
C) up to 25 wt. %, based on the total weight of components A), B) and C), of a monohydric polyalkylene oxide polyether alcohol containing a statistical average of 5 to 35 ethylene oxide units, in the presence of
D) 0.2 to 2.0 equivalents, based on the sulfonic acid groups of component B), of a tertiary amine are reacted with one another observing an equivalent ratio of NCO groups to groups which are reactive towards NCO groups of 2:1 to 400:1. The nature and ratio of amounts of the starting compounds mentioned are otherwise chosen here such that the resulting reaction products meet the conditions mentioned above under a) to d).

The invention also provides the use of these polyisocyanates as starting components in the preparation of polyurethane plastics, in particular as crosslinking agents for water-soluble or -dispersible paint binders or paint binder components in the production of coverings using aqueous coating compositions based on such binders or binder components.

Finally, the invention also provides the use of these polyisocyanates as starting components in the preparation of blocked polyisocyanates which are water-dispersible or present as a dispersion in water.

Component A) to be employed in the process according to the invention as a rule has an average NCO functionality of 2.0 to 5.0, preferably 2.3 to 4.5, a content of isocyanate groups of 8.0 to 27.0 wt. %, preferably 14.0 to 24.0 wt. %, and a content of monomeric diisocyanates of less than 1 wt. %, preferably less than 0.5 wt. %. It comprises at least one organic polyisocyanate with aliphatically, cycloaliphatically, araliphatically and/or aromatically bonded isocyanate groups.

The polyisocyanates of component A) are any desired polyisocyanates which are built up from at least two diisocyanates and are prepared by modification of simple aliphatic, cycloaliphatic, araliphatic and/or aromatic diisocyanates and have a uretdione, isocyanurate, allophanate, biuret, iminooxadiazinedione and/or oxadiazinetrione structure, such as are described by way of example, for example, in J. Prakt. Chem. 336 (1994) 185–200, in DE-A 1 670 666, DE-A 1 954 093, DE-A 2 414 413, DE-A 2 452 532, DE-A 2 641 380, DE-A 3 700 209, DE-A 3 900 053 and DE-A 3 928 503 or in EP-A 0 336 205, EP-A 0 339 396 and EP-A 0 798 299.

Suitable diisocyanates for the preparation of such polyisocyanates are any desired diisocyanates which are accessible by phosgenation or by phosgene-free processes, for example by thermal urethane cleavage. Preferred isocyanates are those of the molecular weight range of 140 to 400 with aliphatically, cycloaliphatically, araliphatically and/or aromatically bonded isocyanate groups, such as e.g. 1,4-diisocyanatobutane, 1,6-diisocyanatohexane (HDI), 2-methyl-1,5-diisocyanatopentane, 1,5-diisocyanato-2,2-dimethylpentane, 2,2,4- and 2,4,4-trimethyl-1,6- diisocyanatohexane, 1,10-diisocyanatodecane, 1,3- and 1,4-diisocyanatocyclohexane, 1,3- and 1,4-bis-(isocyanatomethyl)-cyclohexane, 1-isocyanato-3,3,5-trimethyl-5-isocyanatomethylcyclohexane (isophoronediisocyanate, IPDI), 4,4'-diisocyanatodicyclohexylmethane, 1-isocyanato-1-methyl-4(3)isocyanato-methylcyclohexane, bis-(isocyanatomethyl)-norbornane, 1,3- and 1,4-bis-(2-isocyanato-prop-2-yl)-benzene (TMXDI), 2,4- and 2,6-diisocyanatotoluene (TDI), 2,4'- and 4,4'-diisocyanatodiphenylmethane (MDI), 1,5-diisocyanatonaphthalene or any desired mixtures of such diisocyanates.

The starting components A) are preferably polyisocyanates of the type mentioned with exclusively aliphatically and/or cycloaliphatically bonded isocyanate groups.

Very particularly preferred starting components A) are polyisocyanates with an isocyanurate structure which are based on HDI, IPDI and/or 4,4'-diisocyanatodicyclohexylmethane.

In addition to these hydrophobic polyisocyanates, however, polyisocyanates which are modified hydrophilically with the aid of ethylene oxide polyethers and such as are obtainable, for example, by the processes described in EP-A 0 959 087, page 2, lines 25–46 are also suitable as starting compounds A).

Component B) is 2-(cyclohexylamino)-ethanesulfonic acid (CHES), 3-(cyclohexylamino)-propanesulfonic acid (CAPS) or any desired mixtures of these two aminosulfonic acids. These compounds are known, they are in crystalline form as zwitter-ionic substances, and have melting points above 300° C. The preparation of CHES and CAPS is described, for example, in Bull. Soc. Chim. France 1985, 463 and in Z. Chem. 7, 151 (1967).

These aminosulfonic acids B) are employed in the process according to the invention in amounts of 0.3 to 25 wt. %, preferably 0.5 to 25 wt. %, based on the total weight of components A) and B).

Components C) which are optionally co-used are monohydric polyalkylene oxide polyether alcohols which contain a statistical average of 5 to 35, preferably 7 to 30 ethylene oxide units per molecule, such as are accessible in a manner known per se by alkoxylation of suitable starter molecules (see e.g. Ullmanns Encyclopädie der technischen Chemie, 4th edition, volume 19, Verlag Chemie, Weinheim p. 31–38).

As suitable starter molecules for the preparation of the polyether alcohols C) employed in the process according to the invention there may be mentioned here by way of example: saturated monoalcohols, such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane, or tetrahydrofurfuryl alcohol; unsaturated alcohols, such as allyl alcohol, 1,1-dimethyl-allyl alcohol or oleyl alcohol, aromatic alcohols such as phenol, the isomeric cresols or methoxyphenols, araliphatic alcohols, such as benzyl alcohol, anisyl alcohol or cinnamyl alcohol; secondary monoamines, such as dimethylamine, diethylamine, dipropylamine, diisopropylamine, di-n-butylamine, diisobutylamine, bis-(2-ethylhexyl)-amine, N-methyl- and N-ethylcyclohexylamine or dicyclohexylamine, and heterocyclic secondary amines, such as morpholine, pyrrolidine, piperidine or 1H-pyrazole.

Preferred starter molecules are saturated monoalcohols having up to 4 carbon atoms. Methanol is particularly preferably used as the starter molecule.

Alkylene oxides which are suitable for the alkoxylation reaction are, in particular, ethylene oxide and propylene oxide, which can be employed in the alkoxylation reaction in any desired sequence or also as a mixture.

The polyalkylene oxide polyether alcohols C) are either pure polyethylene oxide polyethers or mixed polyalkylene oxide polyethers, the alkylene oxide units of which comprise ethylene oxide units to the extent of at least 30 mol %, preferably to the extent of at least 40 mol %.

Preferred starting components C) for the process according to the invention are pure polyethylene glycol monomethyl ether alcohols which contain a statistical average of 7 to 30, very particularly preferably 7 to 25 ethylene oxide units.

The polyether alcohols C) are employed in the process according to the invention, if at all, in amounts of up to 25 wt. %, preferably up to 20 wt. %, based on the total weight of components A), B) and C).

Tertiary amines D) are employed in the process according to the invention for neutralization of the sulfonic acid groups of starting components B). These are, for example, tertiary monoamines, such as e.g. trimethylamine, triethylamine, tripropylamine, tributylamine, dimethylcyclohexylamine, N-methylmorpholine, N-ethylmorpholine, N-methylpiperidine or N-ethylpiperidine, or tertiary diamines, such as e.g. 1,3-bis-(dimethylamino)-propane, 1,4-bis-(dimethylamino)-butane or N,N'-dimethylpiperazine. However, tertiary amines which carry groups which are reactive towards isocyanates are also suitable, but less preferred, neutralization amines, for example alkanolamines, such as e.g. dimethylethanolamine, methyldiethanolamine or triethanolamine.

These neutralization amines D) are employed in the process according to the invention in those amounts which correspond to an equivalent ratio of tertiary amino groups to sulfonic acid groups of component B) of 0.2 to 2.0, preferably 0.5 to 1.5.

To carry out the process according to the invention, the starting components A), B) and optionally C) are reacted with one another in the presence of a tertiary amine D) at temperatures of 40 to 1 50° C., preferably 50 to 1 30° C., observing an equivalent ratio of NCO groups to groups which are reactive towards NCO groups of 2:1 to 400:1, preferably 4:1 to 250:1, preferably until the theoretically calculated NCO content is reached.

The presence of the tertiary amine D) as a rule catalyses the reaction of components A), B) and optionally C) sufficiently, but further conventional catalysts known from polyurethane chemistry can optionally be employed to accelerate the reaction in the process according to the invention, for example further tert. amines, such as triethylamine, pyridine, methylpyridine, benzyldimethylamine, N,N-endoethylenepiperazine, N-methylpiperidine, pentamethyldiethylenetriamine, N,N-dimethyl-aminocyclohexane or N,N'-dimethylpiperazine, or metal salts, such as iron(III) chloride, aluminium tri(ethylacetoacetate), zinc chloride, zinc(II) n-octanoate, zinc(II) 2-ethyl-1-hexanoate, zinc(II) 2-ethylcaproate, zinc(II) stearate, zinc(II) naphthenate, zinc(II) acetylacetonate, tin (II) n-octanoate, tin(II) 2-ethyl-1-hexanoate, tin(II) ethylcaproate, tin(II) laurate, tin(II) palmitate, dibutyltin(IV) oxide, dibutyltin(IV) dichloride, dibutyltin(IV) diacetate, dibutyltin(IV) dimaleate, dibutyltin(IV) dilaurate, dioctyltin (IV) diacetate or molybdenum glycollate, or any desired mixtures of such catalysts.

These catalysts are employed in the process according to the invention, if at all, in an amount of 0.001 to 2 wt. %, preferably 0.005 to 0.5 wt. %, based on the total weight of the reaction partners.

The process according to the invention can optionally be carried out in a suitable solvent which is inert towards isocyanate groups. Suitable solvents are, for example, the conventional paint solvents which are known per se, such as e.g. ethyl acetate, butyl acetate, ethylene glycol monomethyl or -ethyl ether-acetate, 1-methoxyprop-2-yl acetate, 3-methoxy-n-butyl acetate, acetone, 2-butanone, 4-methyl-2-pentanone, cyclohexanone, toluene, xylene, chlorobenzene, white spirit, more highly substituted aromatics such as are commercially available, for example, under the names Solvent Naphtha, Solvesso®, Isopar®, Nappar® (Deutsche EXXON CHEMICAL GmbH, Cologne, DE) and Shellsol® (Deutsche Shell Chemie GmbH, Eschbom, DE), carbonic acid esters, such as dimethyl carbonate, diethyl carbonate, 1,2-ethylene carbonate and 1,2-propylene carbonate, lactones, such as β-propiolactone, γ-butyrolactone, ε-caprolactone and ε-methylcaprolactone, and also solvents such as propylene glycol diacetate, diethylene glycol dimethyl ether, dipropylene glycol dimethyl ether, diethylene glycol ethyl and butyl ether-acetate, N-methylpyrrolidone and N-methylcaprolactam, or any desired mixtures of such solvents.

In the process according to the invention, the nature and ratios of amounts of the starting components are otherwise chosen, in the context of the statements made, such that the resulting polyisocyanates correspond to the statements made above under a) to d), wherein a) the average NCO functionality is preferably 2.0 to 4.8, particularly preferably 2.4 to 3.8, b) the NCO content is preferably 7.0 to 23.0 wt. %, particularly preferably 10.0 to 22.0 wt. %, c) the content of sulfonate groups (calculated as $SO_3^-$; molecular weight=80) is preferably 0.2 to 6.3 wt. %, particularly preferably 0.6 to 4.8 wt. %, and d) the content of ethylene oxide units bonded within polyether chains is preferably up to 17 wt. %, particularly preferably up to 15 wt. %.

The process products according to the invention are clear, practically colourless polyisocyanates of the composition already mentioned above which can easily be converted into sedimentation-stable dispersions by merely stirring into water, without using high shear forces.

The outstanding dispersibility already at low sulfonate group contents in compounds with high NCO contents and comparatively high functionalities is an advantage in particular for the use of the polyisocyanates according to the invention in aqueous 2C PU paints, since highly crosslinked coatings which have in particular, in addition to a very good resistance to solvents and chemicals, an excellent resistance to water because of the low content of hydrophilic groups can be obtained in this manner.

Further non-hydrophilized polyisocyanates, in particular paint polyisocyanates of the abovementioned type, can optionally also be added to the polyisocyanates prepared by the process according to the invention before the emulsification, the ratios of amounts preferably being chosen such that the resulting polyisocyanate mixtures meet the conditions mentioned above under a) to d), and are consequently also polyisocyanates according to the invention, since these in general comprise mixtures of (i) polyisocyanates modified hydrophilically according to the invention and
(ii) non-modified polyisocyanates of the type mentioned by way of example.

In such mixtures the process products according to the invention take over the function of an emulsifier for the subsequently admixed content of non-hydrophilic polyisocyanates.

The polyisocyanates according to the invention are valuable starting materials for the preparation of polyisocyanate plastics by the isocyanate polyaddition process.

For this, the polyisocyanates are preferably employed in the form of aqueous emulsions, which can be reacted in combination with polyhydroxy compounds dispersed in water in the sense of aqueous two-component systems.

The polyisocyanates according to the invention are particularly preferably used as crosslinking agents for paint binders or paint binder components which are dissolved or dispersed in water and have groups which are reactive towards isocyanate groups, in particular alcoholic hydroxyl groups, in the production of coatings using aqueous coating compositions based on such binders or binder components. The combining of the crosslinking agent, optionally in emulsified form, with the binders or binder components can be carried out here by simple stirring before processing of the coating compositions by any desired methods, using mechanical aids known to the expert or also using two-component spray guns.

In this connection, paint binders or paint binder components which may be mentioned by way of example are: polyacrylates which are dissolved or dispersed in water and contain hydroxyl groups, in particular those of the molecular weight range of 1,000 to 10,000, which, with organic polyisocyanates as crosslinking agents, are valuable two-component binders, or optionally urethane-modified polyester resins containing hydroxyl groups, of the type known from polyester and alkyd resin chemistry, which are dispersed in water. All binders which are dissolved or dispersed in water and contain groups which are reactive towards isocyanates are in principle suitable as reaction partners for the polyisocyanate mixtures according to the invention. These also include, for example, polyurethanes or polyureas which are dispersed in water and can be crosslinked with polyisocyanates on the basis of the active hydrogen atoms present in the urethane or urea groups.

The polyisocyanate mixtures according to the invention are in general employed in the use according to the invention as crosslinking components for aqueous paint binders in those amounts which correspond to an equivalent ratio of NCO groups to groups which are reactive towards NCO groups, in particular alcoholic hydroxyl groups, of 0.5:1 to 2:1.

The polyisocyanate mixtures according to the invention can also optionally be admixed in minor amounts to non-functional aqueous paint binders to achieve quite specific properties, for example as an additive to improve adhesion.

The polyisocyanates according to the invention can of course also be employed in a form blocked with blocking agents known per se from polyurethane chemistry, in combination with the abovementioned aqueous paint binders or paint binder components in the sense of aqueous one-component PU stoving systems. Suitable blocking agents are, for example, malonic acid diethyl ester, acetoacetic ester, acetone oxime, butanone oxime, ε-caprolactam, 3,5-dimethylpyrazole, 1,2,4-triazole, dimethyl-1,2,4-triazole, imidazole or any desired mixtures of these blocking agents.

Possible substrates for the aqueous coatings formulated with the aid of the polyisocyanates according to the invention are any desired substrates, such as e.g. metal, wood, glass, stone, ceramic materials, concrete, rigid and flexible plastics, textiles, leather and paper, which can optionally also be provided with conventional primers before the coating.

The aqueous coating compositions which are formulated with the polyisocyanates according to the invention and to which the conventional auxiliary substances and additives in the paint sector, such as e.g. flow auxiliaries, coloured pigments, fillers, matting agents or emulsifiers, can optionally be added in general already have good paint properties on drying at room temperature.

However, they can of course also be dried under forced conditions at elevated temperature or by stoving at temperatures up to 260° C.

Because of their outstanding emulsifiability in water, which allows a homogenous, particularly finely divided distribution in aqueous paint binders, the use of the polyisocyanates according to the invention as crosslinking components for aqueous polyurethane paints leads to coatings with outstanding optical properties, in particular high surface gloss, flow and high transparency.

In addition to the preferred use as crosslinking components for aqueous 2C PU paints, the polyisocyanates according to the invention are outstandingly suitable as crosslinking agents for aqueous dispersion adhesives, leather and textile coatings or textile printing pastes, as AOX-free papermaking auxiliaries or also as additives for mineral building materials, for example concrete or mortar compositions.

The following examples serve to further illustrate the invention. Unless noted otherwise, all the percentage data relate to the weight.

EXAMPLES

Example 1

950 g (4.90 eq) of a polyisocyanate which contains isocyanurate groups and is based on 1,6-diisocyanatohexane (HDI), with an NCO content of 21.7%, an average NCO functionality of 3.5 (according to GPC), a content of monomeric HDI of 0.1% and a viscosity of 3,000 mPas (23° C.), are stirred together with 50 g (0.23 eq) 3-(cyclohexylamino)-propanesulfonic acid (CAPS), 29 g (0.23 mol) dimethylcyclohexylamine and 257 g 1-methoxyprop-2-yl acetate under dry nitrogen for 5 hours at 80° C. After cooling to room temperature, a practically colourless clear solution of a polyisocyanate mixture according to the invention with the following characteristic data is present:

| | |
|---|---|
| Solids content: | 80% |
| NCO content: | 15.7% |
| NCO functionality: | 3.3 |
| Viscosity (23° C.): | 590 mPas |
| Colour number: | 15 APHA |
| Sulfonate group content: | 1.4% |
| Ethylene oxide content: | 0.0% |

Example 2

970 g (5.0 eq) of the polyisocyanate described in example 1 which contains isocyanurate groups and is based on HDI are stirred together with 30 g (0.14 eq) 2-(cyclohexylamino)-ethanesulfonic acid (CHES), 18 g (0.14 mol) dimethylcyclohexylamine and 255 g dipropylene glycol dimethyl ether under dry nitrogen for 4 hours at 80° C. After cooling to room temperature, a practically colourless clear solution of a polyisocyanate mixture according to the invention with the following characteristic data is present:

| | |
|---|---|
| Solids content: | 80% |
| NCO content: | 16.1% |
| NCO functionality: | 3.4 |
| Viscosity (23° C.): | 660 mPas |
| Colour number: | 10 APHA |
| Sulfonate group content: | 0.9% |
| Ethylene oxide content: | 0.0% |

Example 3

900 g (4.97 eq) of a polyisocyanate which contains isocyanurate groups and is based on HDI, with an NCO content of 23.2%, an average NCO functionality of 3.2 (according to GPC), a content of monomeric HDI of 0.1% and a viscosity of 1,200 mPas (23° C.) are stirred together with 100 g (0.45 eq) CAPS and 57 g (0.45 mol) dimethylcyclohexylamine under dry nitrogen for 10 hours at 80° C. After cooling to room temperature, a practically colourless clear polyisocyanate mixture according to the invention with the following characteristic data is present:

| | |
|---|---|
| Solids content: | 100% |
| NCO content: | 18.0% |
| NCO functionality: | 2.9 |
| Viscosity (23° C.): | 9,200 mPas |
| Colour number: | 25 APHA |
| Sulfonate group content: | 3.4% |
| Ethylene oxide content: | 0.0% |

Example 4

900 g (4.65 eq) of the polyisocyanate described in example 1 which contains isocyanurate groups and is based on HDI are stirred together with 50 g (0.23 eq) CAPS, 29 g (0.23 mol) dimethylcyclohexylamine, 50 g (0.10 eq) of a monofunctional polyethylene oxide polyether started on methanol and having an average molecular weight of 500 and 257 g dipropylene glycol dimethyl ether as the solvent under dry nitrogen for 6 hours at 80° C. After cooling to room temperature, a practically colourless clear solution of a polyisocyanate mixture according to the invention with the following characteristic data is present:

| | |
|---|---|
| Solids content: | 80% |
| NCO content: | 14.1% |
| NCO functionality: | 3.3 |
| Viscosity (23° C.): | 630 mPas |
| Colour number: | 10 APHA |
| Sulfonate group content: | 1.4% |
| Ethylene oxide content: | 3.6% |

Example 5

1.357 g (3.84 eq) of a polyisocyanate which is in the form of a 70% solution in butyl acetate, contains isocyanurate groups and is based on 1-isocyanato-3,3,5-trimethyl-5-isocyanatomethylcyclohexane (IPDI), with an NCO content of 11.9%, an average NCO functionality of 3.3 according to GPC, a content of monomeric IPDI of 0.2% and a viscosity of 650 mPas (23° C.) are stirred together with 50 g (0.23 eq) CAPS, 29 g (0.23 mol) dimethylcyclohexylamine and a further 34 g butyl acetate under dry nitrogen for 12 hours at 80° C. After cooling to room temperature, a practically colourless clear solution of a polyisocyanate mixture according to the invention with the following characteristic data is present:

| | |
|---|---|
| Solids content: | 70% |
| NCO content: | 10.3% |
| NCO functionality: | 3.1 |
| Viscosity (23° C.): | 810 mPas |
| Colour number: | 10–15 APHA |
| Sulfonate group content: | 1.2% |
| Ethylene oxide content: | 0.0% |

Example 6

Comparison 950 g (4.90 eq) of the polyisocyanate described in example 1 which contains isocyanurate groups and is based on HDI are stirred together with 50 g (0.36 eq) 2-methylaminoethanesulfonic acid (methyltaurine), 46 g (0.36 mol) dimethylcyclohexylamine and 262 g 1-methoxyprop-2-yl acetate under dry nitrogen at 80° C. After 8 hours the reaction mixture is still cloudy and inhomogeneous. Even after increasing the temperature to 120° C. and a further 4 hours the starting components have not reacted with one another. Methyltaurine settles in crystalline form as a sediment in the dark yellow-coloured reaction mixture.

Example 7

Comparison 950 g (4.90 eq) of the polyisocyanate described in example 1 which contains isocyanurate groups and is based on HDI are stirred together with 50 g (0.40 eq) 2-aminoethanesulfonic acid (taurine), 51 g (0.40 mol) dimethylcyclohexylamine and 263 g 1-methoxyprop-2-yl acetate under dry nitrogen at 80° C. After 8 hours the reaction mixture is still cloudy. Even after increasing the temperature to 120° C. and a further 6 hours the starting components have not reacted with one another. Methyltaurine settles as a crystalline sediment in the yellow-coloured reaction mixture.

Example 8

Comparison Analogously to EP-B 0 703 255, Example 5

800 g (4.13 eq) of the polyisocyanate described in example 1 which contains isocyanurate groups and is based on HDI are stirred together with 200 g (0.30 eq) of a sodium polyethylene oxide polyether diol-sulfonate (Tegomer® DS-3404, Th. Goldschmidt A G, Essen, DE; OH number: 84, sulfonate group content: approx. 6.0%, ethylene oxide content: approx. 82.2%) and 250 g 1-methoxyprop-2-yl acetate as the solvent under dry nitrogen for 5 hours at 80° C. After cooling to room temperature, a yellowish clear solution of a water-dispersible polyisocyanate mixture with the following characteristic data is present:

| | |
|---|---|
| Solids content: | 80% |
| NCO content: | 12.9% |
| NCO functionality: | 3.7 |
| Viscosity (23° C.): | 1,800 mPas |
| Colour number: | 150 APHA |
| Sulfonate group content: | 1.0% |
| Ethylene oxide content: | 13.2% |

Example 9

Preparation of Emulsions 100 g deionized water were added to in each case 35 g of the polyisocyanate mixtures according to the invention, dissolved to 80%, from example 1, 2 and 4, 40 g of the 70% solution from example 5 and 25 g of the polyisocyanate mixture according to the invention from example 3 in each case in a conical flask, corresponding to a solids content of in each case approx. 20 wt. %, and the mixtures were then in each case stirred for 1 min with the aid of a magnetic stirrer at 900 rpm. The emulsions obtained by this procedure were still completely stable even after a standing time of 5 h. They showed neither visible evolution of $CO_2$ nor precipitates or sediment. The average particle sizes were determined with the aid of a Zetasizer apparatus (Malvern Instruments GmbH, Herrenberg, DE) as a measure of the dispersibility of the various polyisocyanate mixtures. The following table shows the values found.

| Polyisocyanate mixture from | Average particle size [nm] |
|---|---|
| Example 1 | 116 |
| Example 2 | 412 |
| Example 3 | 83 |
| Example 4 | 93 |
| Example 5 | 242 |

Example 10

Use as Crosslinking Agents for Aqueous 2C PU Paints 100 parts by wt. of an aqueous, hydroxy-functional polyacrylate dispersion which is free from co-solvent and has a solids content of 45% and an OH content of 2.5%, based on the solid resin, substantially comprising 48.0% methyl methacrylate, 27.4% n-butyl acrylate, 21.6% hydroxy-$C_3$-alkyl methacrylate (addition product of propylene oxide on methacrylic acid) and 3.0% acrylic acid, were mixed with 0.5 parts by wt. of a commercially available defoamer (Foamaster® TCX, Henkel KGA, DE). 39.5 parts by wt. of the polyisocyanate mixture according to the invention from example 1 (corresponding to an equivalent ratio of isocyanate groups to alcoholic hydroxyl groups of 1:1) were added to this mixture and the mixture was homogenized by intensive stirring (2,000 rpm). The solids content was then adjusted to 40% by addition of water.

For comparison, a paint was prepared from 100 parts by wt. of the hydroxy-functional polyacrylate dispersion described above and 48.0 parts by wt. of the polyisocyanate according to EP-B 0 703 255 from example 8 (corresponding to an equivalent ratio of isocyanate groups to alcoholic hydroxyl groups of 1:1) by the process described above.

The processing time of the paints ready for application was about 3 hours. The paints were applied to glass plates in a wet film layer thickness of 150 μm (approx. 60 μm dry) and, after evaporation in air for 20 minutes, were dried under forced conditions (30 min/60° C.). Paint films with the following properties were obtained:

| Polyisocyanate from | Example 1 | Example 8 (comparison) |
|---|---|---|
| Film optical properties | clear | cloudy |
| Gloss, visually[a] | 0 | 5 |
| Pendulum hardness [s] after 1 d/7 d[b] | 125/143 | 79/105 |
| Resistance to solvents[c] | | |
| water (30 min) | 0 | 5 |
| isopropanol/water 1:1 (1 min) | 0 | 3 |
| MPA/xylene 1:1 (1 min) | 0 | 1 |
| butyl glycol (1 min) | 0 | 2 |
| acetone (1 min) | 1 | 4 |

[a]Evaluation: 0 (very good)–5 (poor)
[b]König pendulum hardness (DIN 53157)
[c]Evaluation: 0–5 (0 = paint film unchanged; 5 = completely dissolved)

The comparison shows that the use of the polyisocyanates according to the invention from example 1 leads to a clear, high-gloss, hard and solvent-resistant paint film, while using the polyisocyanate containing sodium sulfonate groups from example 8 a cloudy and considerably softer coating is obtained, which moreover is not water-resistant and not sufficiently solvent-resistant.

Example 11

Preparation of a Blocked Polyisocyanate 350 g (1.31 eq) of the polyisocyanate mixture according to the invention from example 1 are initially introduced into the reaction vessel at 70° C. and 126 g (1.31 eq) 3,5-dimethylpyrazole are added in portions in the course of 30 min such that the temperature of the reaction mixture does not exceed 80° C. When the addition has ended, the mixture is subsequently stirred for approx. 2 hours at 70° C. until free isocyanate groups are no longer detectable by IR spectroscopy. After cooling to 40° C., 539 g deionized water are allowed to run in, with vigorous stirring, in the course of 30 min. A finely divided bluish-tinged dispersion of a blocked polyisocyanate with the following characteristic data is obtained:

| | |
|---|---|
| Solids content: | 40% |
| Content of blocked NCO groups: | 5.4% |
| NCO functionality: | 3.7 |
| Viscosity (23° C.): | 160 mPas |
| Co-solvent content: | 6.9% |

What is claimed is:

1. A modified polyisocyanate which comprises the reaction product of a polyisocyanate with 2-(cyclohexylamino)-ethanesulfonic acid and/or 3-(cyclohexylamino)-propanesulfonic acid.

2. The modified polyisocyanate of claim 1 wherein the modified polyisocyanate has a) an average isocyanate functionality of at least 1.8, b) a content of isocyanate groups (calculated as NCO; MW 42) of 4.0 to 26.0 wt. %, c) a content of sulfonate groups (calculated as $SO_3$—; MW 80) of 0.1 to 7.7 wt. % and d) a content of ethylene oxide units (calculated as $C_2H_2O$; MW 44) bound within polyether chains of 0 to 19.5 wt. %, wherein the polyether chains contain an average of 5 to 55 ethylene oxide units.

3. The modified polyisocyanate of claim 1 wherein the modified polyisocyanate has a) an average isocyanate functionality of 2.0 to 4.8, b) a content of isocyanate groups (calculated as NCO; MW 42) of 7,0 to 23.0 wt. %, c) a content of sulfonate groups (calculated as $SO_3$-; MW 80) of 0.2 to 6.3 wt. % and d) a content of ethylene oxide units (calculated as $C_2H_2O$; MW 44) bound within polyether chains of 0 to 17.0 wt. %, wherein the polyether chains contain an average of 7 to 30 ethylene oxide units.

4. The modified polyisocyanate of claim 1 wherein said polyisocyanate is an aliphatic, cycloaliphatic, araliphatic and/or aromatic polyisocyanate.

5. The modified polyisocyanate of claim 1 wherein said polyisocyanate is an aliphatic and/or cycloaliphatic polyisocyanate.

6. A process for the preparation of a modified polyisocyanate which comprises reacting a polyisocyanate with 2-(cyclohexylamino)-ethanesulfonic acid and/or 3-(cyclohexylamino)-propanesulfonic acid in the presence of a tertiary amine.

7. The process of claim 6 which comprises carrying out the reaction in the presence of a polyalkylene oxide polyether alcohol containing ethylene oxide units and/or wherein said polyisocyanate contains chemically incorporated ethylene oxide polyether units.

8. The process of claim 6 which comprises reacting at an equivalent ratio of NCO groups to isocyanate-reactive groups of 2:1 to 400:1

A) a polyisocyanate component having an average functionality of 2.0 to 5.0 and a content of aliphatically, cycloaliphatically, araliphatically and/or aromatically bound isocyanate groups (calculated as NCO; MW 42) of 8.0 to 27.0 wt. % with B) 0.3 to 25.0 wt. %, based on the total weight of components A) and B), of 2-(cyclohexylamino)-ethanesulfonic acid and/or 3-(cyclohexylamino)-propanesulfonic acid and C) up to 25 wt. %, based on the total weight of components A), B) and C), of a monohydric polyalkylene oxide polyether alcohol containing an average of 5 to 35 ethylene oxide units, in the presence of D) 0.2 to 2.0 equivalents, based on the sulfonic acid groups of component B), of a tertiary amine.

9. The process of claim 6 which comprises reacting at an equivalent ratio of NCO groups to isocyanate-reactive groups of 4:1 to 250:1

A) a polyisocyanate component having an average functionality of 2.3 to 4.5 and a content of aliphatically and/or cycloaliphatically bound isocyanate groups (calculated as NCO; MW 42) of 14.0 to 24.0 wt. % with B) 0.5 to 25.0 wt. %, based on the total weight of components A) and B), of 2-(cyclohexylamino)-ethanesulfonic acid and/or 3-(cyclohexylamino)-propanesulfonic acid and C) up to 20 wt. %, based on the total weight of components A), B) and C), of a monohydric polyalkylene oxide polyether alcohol containing an average of 5 to 35 ethylene oxide units, in the presence of D) 0.5 to 1.5 equivalents, based on the sulfonic acid groups of component B), of a tertiary amine.

10. The process of claim 6 wherein said polyisocyanate is prepared from at least two molecules of 1,6-diisocyanatohexane, 1-isocyanato-3,3,5-trimethyl-5-isocyanatomethylcyclohexane and/or 4,4'-diisocyanatodicyclohexylmethane.

11. The process of claim 6 wherein said tertiary amine comprises an aliphatically and/or cycloaliphatically substituted tertiary amine.

12. The process of claim 6 wherein said tertiary amine comprises triethylamine, dimethylcyclohexylamine and/or N-methylmorpholine.

13. An aqueous coating composition containing a water-soluble or water-dispersible binder and the modified polyisocyanate of claim 1 as the crosslinking agent.

14. The aqueous coating composition of claim 13 wherein the modified polyisocyanate is blocked with a blocking agent for isocyanate groups.

15. A substrate coated with coating composition of claim 13.

* * * * *